United States Patent Office 2,913,182
Patented Nov. 17, 1959

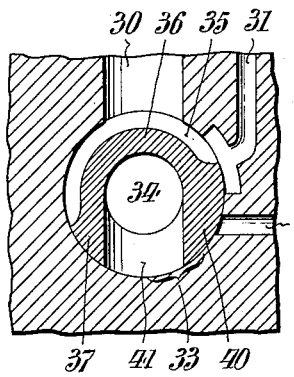
FIG_4_
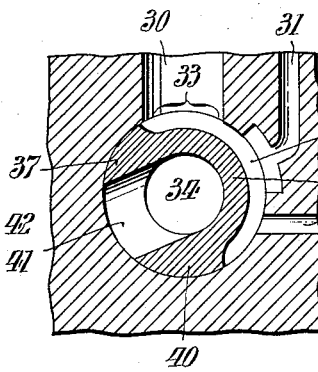
FIG_5_
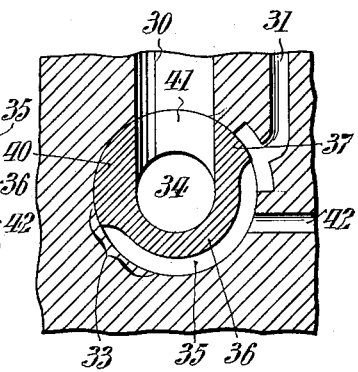
FIG_6_
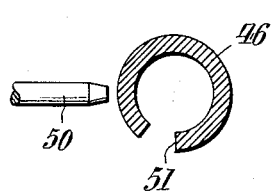
FIG_7_
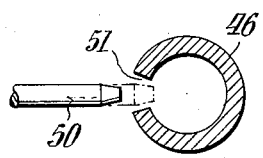
FIG_8_
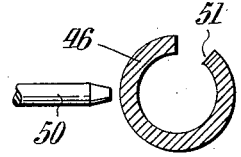
FIG_9_

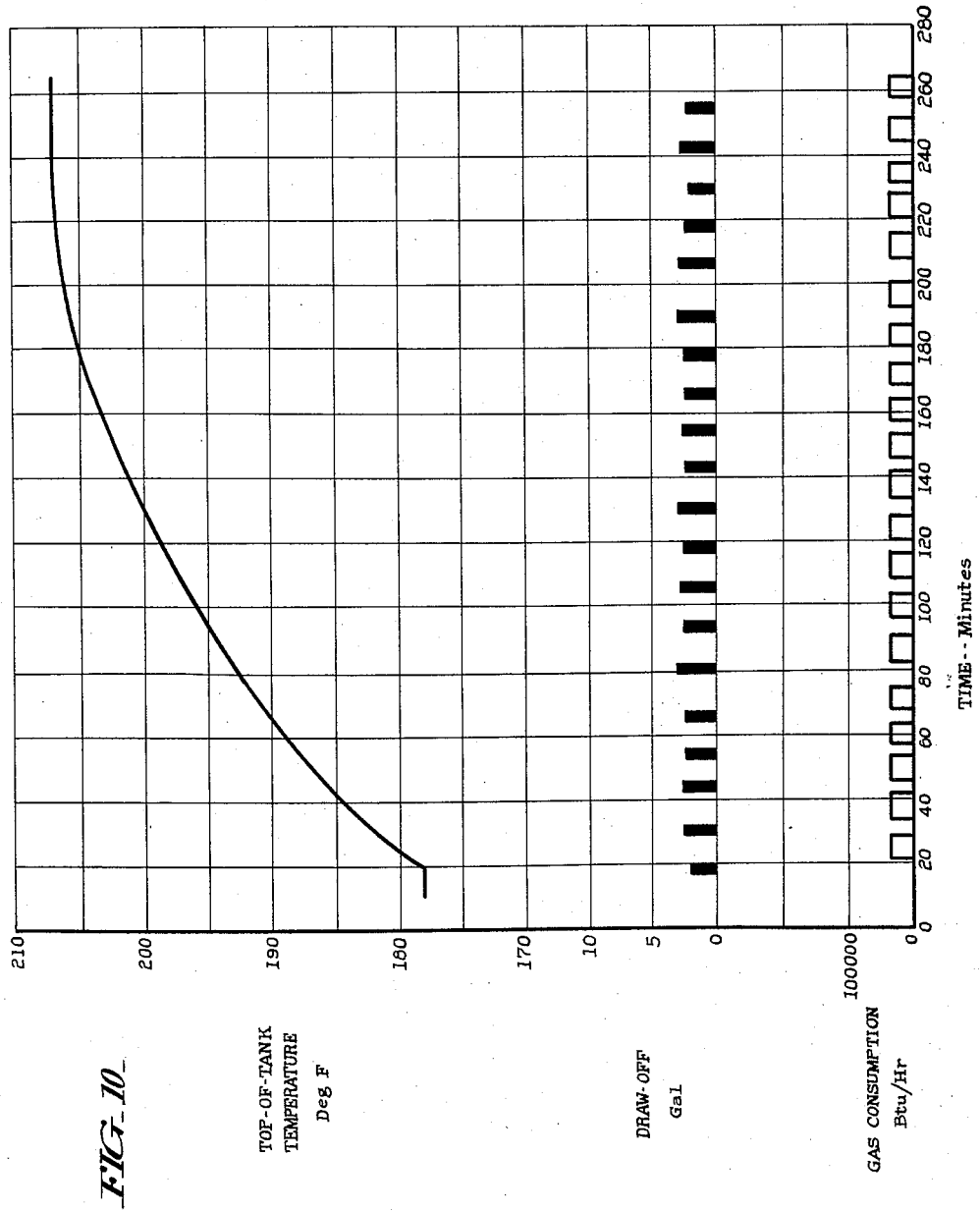

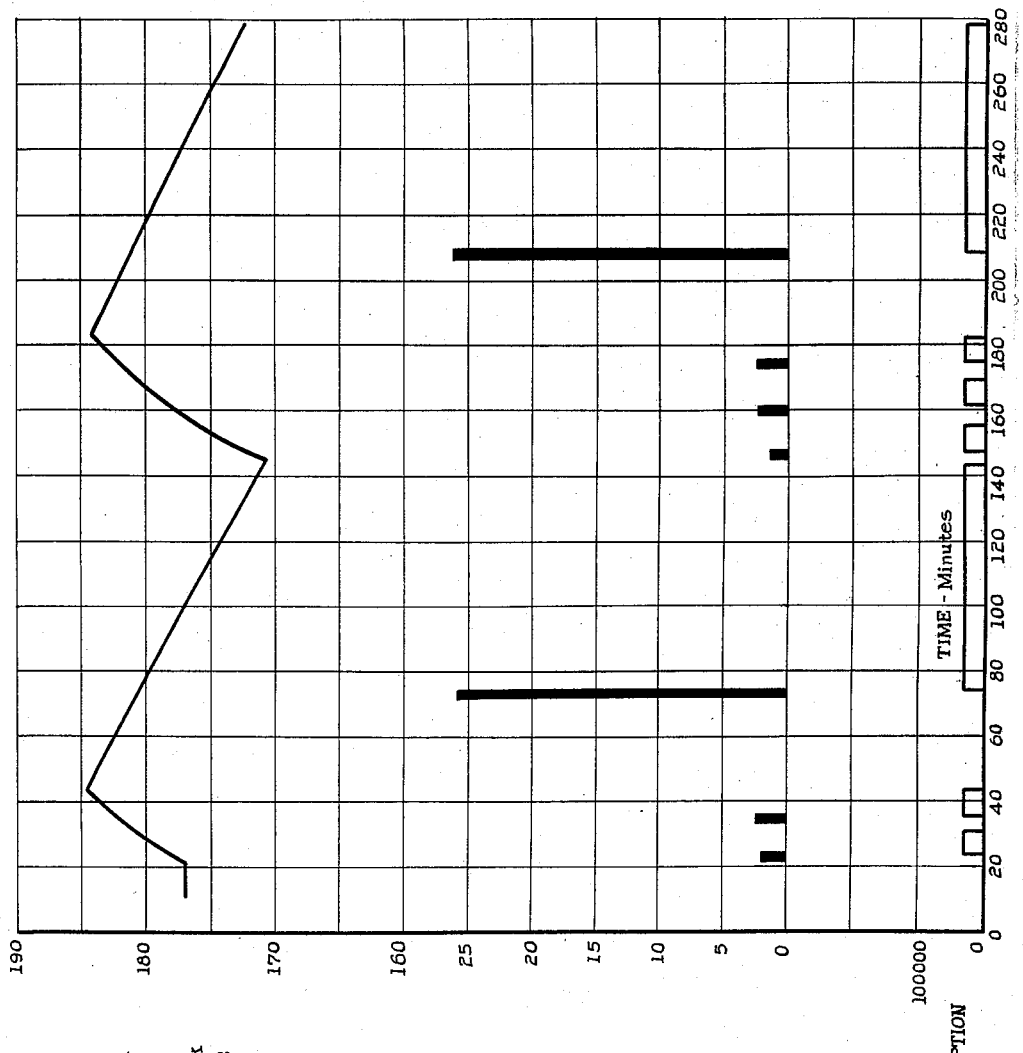

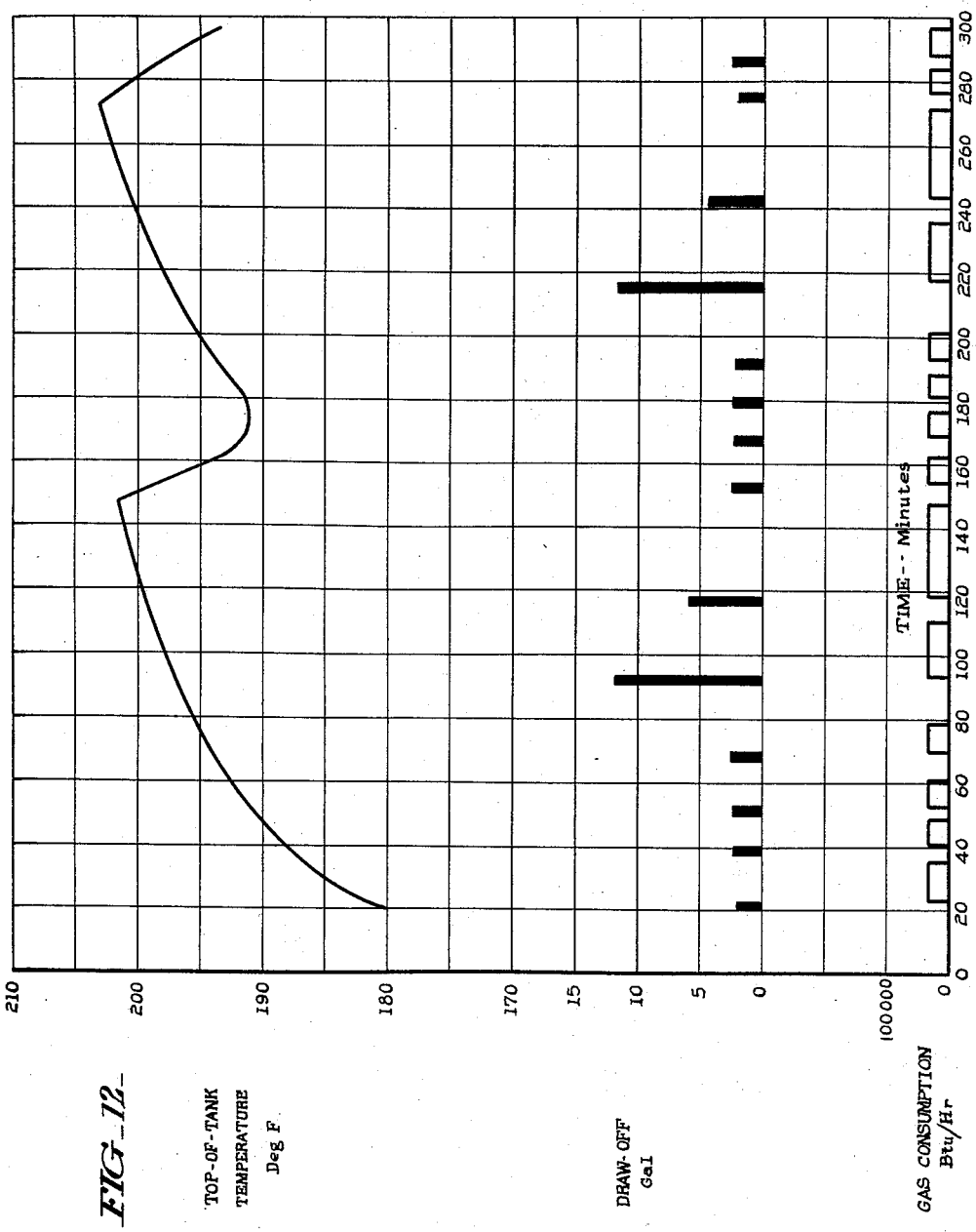

2,913,182

TEMPERATURE CONTROL SYSTEM FOR A STORAGE WATER HEATER

Robert C. Bryce, Southampton, and Frank Kahn, Philadelphia, Pa.

Application April 20, 1955, Serial No. 502,685

6 Claims. (Cl. 236—21)

This invention relates to a storage water heater, and more particularly concerns a control system for a hot water heater of the gas burning type.

When hot water is withdrawn from a conventional storage water heater, the incoming cold water disposes itself in a layer at the bottom of the tank. Should heat be supplied exclusively to the tank bottom, this lower layer of cold water must first be heated to the temperature of the overlying hotter water before there can be a rise in temperature of the water higher in the tank. The thermostat of a conventional storage water heater is located adjacent to the storage tank bottom so that it will operate promptly following withdrawals, to replenish the full reserve of hot water. Where heat is applied to the tank only below the level of the thermostat, there is practically no tendency for the temperature of the water at the top of the tank to become higher than that at the level of the thermostat, and the thermostat therefore will control the temperature at top of tank with reasonable fidelity.

Where heat is also supplied to the water at a location above the thermostat, for example in a gas water heater by transfer from the gaseous products of combustion traversing the flue passage of which the tank wall forms a part, temperature stratification occurs under certain operating conditions, i.e., the temperature of the water becomes graduated vertically with the hottest water at the top. Because of the absorption of additional heat from the flue gases, temperature of water at top-of-tank can build up to excessive and unsafe values. This build-up of temperature becomes a maximum when successive, short withdrawals of water are made, each immediately after cut-out of the thermostat and each of just sufficient volume to cause the thermostat to cut in. This cyclic build-up of temperature, which may be of the order of 30 F. for contemporary water heaters, has given trouble in the field by causing operation of safety temperature relief devices, with accompanying expense, inconvenience and dissatisfaction. A number of cases of operation of temperature relief devices located at the top of the tank and set to function at 195 F. were attributed to temperature build-up in a gas water heater with a conventional thermostat located adjacent the bottom of the tank and set to limit water temperature to 150 F.

The expanding use of automatic dishwashing equipment has resulted in an increasing demand for hot water to be supplied at 180 F. This poses a problem for the gas water heater, because a build-up of the order of 30 F. from a nominal cut-out temperature of 180-190 F. results in a temperature likely to exceed 212 F., the boiling point of water at atmospheric pressure. It is possible for an explosion to occur when the temperature of the water in a tank exceeds 212 F., should the tank develop a leak. Recognizing this, a nationally accredited inter-industry group has recommended that temperature-relief devices for water heaters should function at or below 210 F. The possibility of occurrence of temperatures above 212 F. during normal operation of the heater is extremely undesirable, since it would preclude the use of a temperature relief device set to prevent steaming temperatures, and would require the heater to be equipped to meet steam boiler codes and regulations, involving, among other increased costs, the expense of periodic inspection by authorities having jurisdiction. The need to maintain the water in the tank at temperatures below the boiling point has long been evident but the method of such control has heretofore not been available.

It is accordingly an object of this invention to provide an efficient and inexpensive thermostatic control system for a storage water heater. Another object is to provide cyclic thermostatic control means for a storage water heater for limiting the extent of temperature build-up. Still another object is to provide a means for furnishing water from a storage tank at a temperature of about 180–190 F., without the water at the top of the tank exceeding a temperature appreciably below 210 F. Other objects and advantages of this invention will further become apparent hereinafter, and in the drawings, whereof:

Fig. 4 represents a sectional view of a gas control valve comprising a component of the control system of Fig. 1, taken as indicated by the lines and arrows IV—IV which appear in Fig. 1;

Figs. 5 and 6 represent views similar to Fig. 4, illustrating different valve positions;

Fig. 7 represents a sectional view of a plunger device comprising a component of the control system of Fig. 1, taken as indicated by the lines and arrows VII—VII which appear in Fig. 1;

Figs. 8 and 9 represent views similar to Fig. 7, illustrating different positions of the plunger device and valve; and Figs. 10, 11 and 12 are graphs illustrating operating characteristics, respectively, of a conventional storage water heater and of two temperature-controlled storage water heaters in accordance with this invention.

Figure 1:
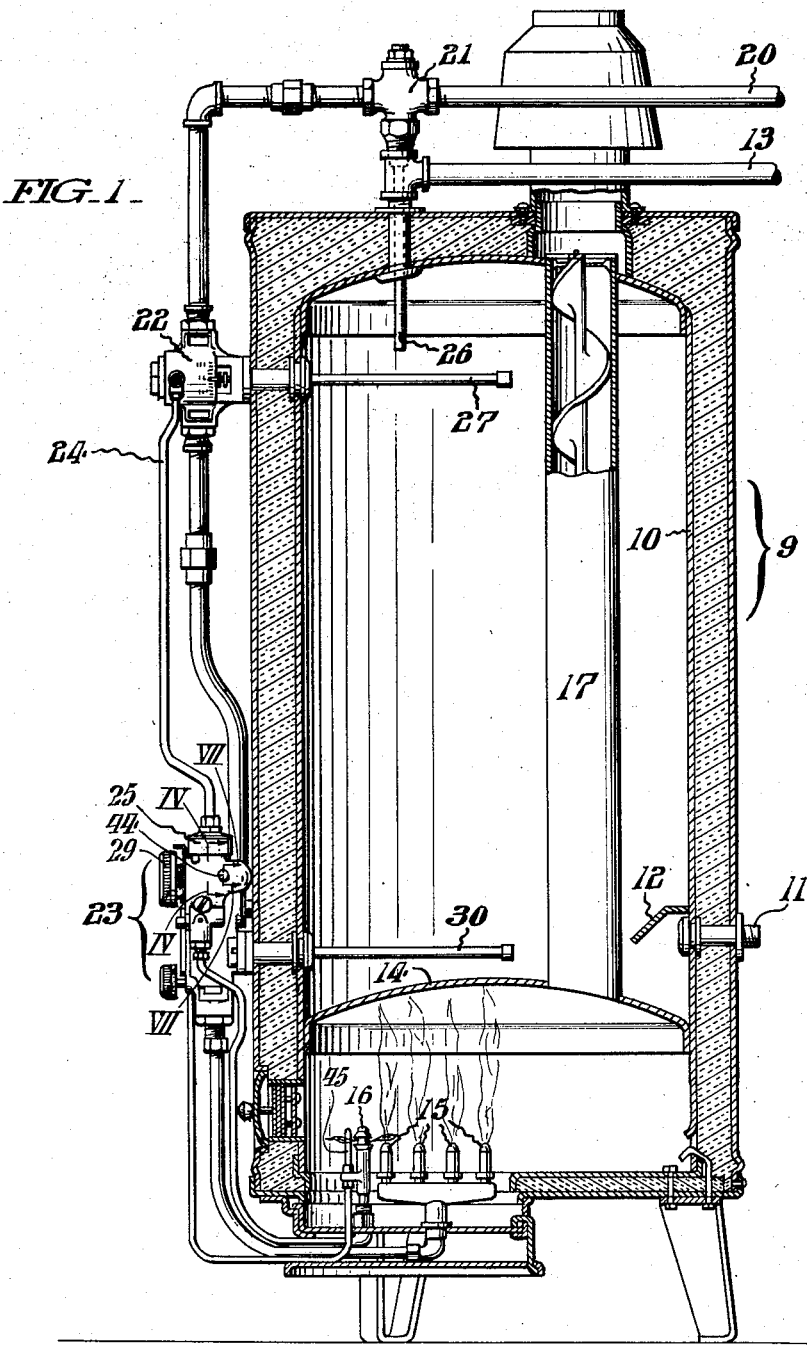
Fig. 1 represents a central vertical sectional view of a storage water heater having a thermostatic control embodying features of our invention.

Turning now to the specific embodiments of the invention selected for illustration in the drawings, the number 9 designates generally an insulated storage water heater including a tank 10 having a water inlet pipe 11 provided with a cold water diffuser 12 and also having a hot water outlet pipe 13. The bottom 14 of tank 10 is spaced above the bottom of heater 9, forming a space for the combustion of gas, a main burner 15 and a pilot burner 16 being provided in said space. A flue pipe 17 extends vertically through the tank 10 and out the top of tank 10 to dispose of the hot combustion products. The apparatus just described is conventional and in common use in domestic hot water heaters and the like. A gas input pipe 20 is connected through an emergency gas shut-off valve 21, then through the valve portion of a cyclic thermostat 22, located adjacent the top of the tank, down through the main valve portion of a control unit 23 located adjacent the bottom of the tank, and then passes to the main burner 15. A pilot gas by-pass line 24 is provided for the pilot burner 16, connected into gas pipe 20 at a point ahead of the cyclic thermostat 22 and by-passing said cyclic thermostat 22. Although the by-pass line 24 appears to be connected directly into the cyclic thermostat 22 in Fig. 1, it by-passes said thermostat, as will further become apparent. The pilot line 24 passes into the control unit 23 and through valve means therein subsequently described herein, then issuing from the unit 23 and passing directly to the pilot burner 16.

The construction and operation of the gas shut-off valve 21 may be of the type shown in U.S. Patent No. 1,752,677, granted to L. D. Lovekin on April 1, 1930. This emergency or safety device includes a temperature-sensitive element 26 extending into the water at the top of tank 10, and includes a fusible member (not shown) which melts when the water temperature reaches the upper limit of safety (at 210 F. or below), permitting a spring-urged member to close the valve 21. It is important to note that this shut-off device is non-cyclic and is intended to shut off all the gas to the apparatus, including the pilot gas, in case of emergency caused by failure of the other controls to operate properly. Valve 21 will not be automatically opened when the water in tank 10 cools off, but will require the insertion of another fusible member, an adjustment which is desirably made by a skilled serviceman.

In contrast to the non-cyclic shut-off device 21, the upper thermostat 22 is cyclic in operation. For example, the thermostat 22 may be of the type shown in the U.S. Patent to J. H. Grayson No. 1,781,328, granted November 11, 1930. This thermostat 22 is of a type whose valve portion alternately opens and closes as the water temperature adjacent the top of tank 10 (detected by the immersion element 27) is decreased and increased. Means are provided for adjusting the thermostat to predetermine the temperature at which the valve portion will be automatically and cyclically opened and closed.

The construction of the control unit 23 may also be of a well-known type. For example, the patent to W. F. Jackson et al. No. 2,361,944 granted November 7, 1944, describes a device suitable for use as the control unit 23. The main valve of the control unit 23 is cyclically controlled, opening and closing the supply of gas to the main burner 15 in response to the rise and fall of water temperature adjacent the bottom of the tank 10, as detected by the temperature-responsive immersion element 30.

Referring to Figs. 4–9 of the drawings, the valve 23 has internal feed passages 30, 31 leading to a central bore in which a rotatable plug 33 is located. Plug 33 is manually controllable from a knob 29 (Fig. 1) and has a hollow center 34 which is a passage leading to the main burner 15. Plug 33 also has a peripheral passage 35 arranged to communicate with the feed passages 30, 31. Plug 33 has a wall 36 separating the passage 35 from the center 34. Wall 36 has enlarged end portions 37, 40 with a port 41 between them. The valve also includes an outlet passage 42 arranged adjacent the inlet 31 and connected to the pilot burner 16 of Fig. 1.

When plug 33 is in the position shown in Fig. 4, the wall 36 closes the passage 30 from passage 34, preventing gas from flowing to the main burner 15, and end portion 40 closes passage 31 from passage 42, thereby preventing gas from flowing to the pilot burner 16. In Fig. 5, peripheral passage 35 allows both passages 30 and 31 to communicate with the passage 42 and thence with the pilot burner 16, but wall 36 closes passage 30 from passage 34. In Fig. 6, passage 30 communicates through port 41 with passage 34 and to the main burner 15, while inlet 31 communicates through peripheral passage 35 and passage 42 with the pilot burner 16. It is important to observe that, in the Fig. 6 position, wall 36 isolates the main burner passages from the pilot burner passages. When the main burner is cut off by the upper cyclic thermostat 22, gas from the pilot passages cannot flow into the main burner even if the lower cyclic thermostat in control unit 23 is open.

Figs. 7–9 show the arrangement of a plunger 50 which is operated by pushing a reset button 44 (Fig. 1) to admit gas from pilot line 24 to light the pilot 16 when the thermocouple 45 (Fig. 1) is cold. A guard 46 integral with the plug 33 has the position shown in Fig. 7 when the plug 33 is in the position shown in Fig. 4, and plunger 50 cannot be depressed to admit gas to the pilot. However, when plug 33 is in the Fig. 5 position, gas can flow to the pilot but not the main burner and in that condition the plunger 50 can be pushed into a slot 51 to the position indicated by dot dash lines in Fig. 8. This enables an operator to light the pilot 16 to heat the thermocouple 45 which, when heated, allows gas to continue to flow to the pilot, even when plunger 50 is returned to the position shown in solid lines in Fig. 8 by a spring (not shown). In Fig. 9, which corresponds to Fig. 6, the plunger cannot be depressed.

The specific construction of the housing, etc., of the valve of Figs. 4–9 is not illustrated in particular detail in the drawings, and is not considered as part of this invention. However, one such construction is shown in the aforementioned U.S. Patent No. 2,361,944, the disclosure of which is incorporated herein by reference.

In operation, assuming the water in tank 10 is cold, and the pilot 16 has been lighted by using the plunger 43 as just described, safety shut-off 21, thermostat 22 and control 23 are open and the burner 15 lights and supplies heat to the water in the tank 10. It is to be assumed that the thermostat 22 is set at a slightly higher temperature than the control 23. For example, when it is desired to store water at a temperature of 180 F., the control 23 may be set at about 180 F., while thermostat 22 may be set at about 195 F. With a substantial quantity of cold water in the tank, when heat is supplied continuously to a tank of cold water there is relatively little temperature stratification of the water, and the temperature at the top of the tank does not rise high enough to close the thermostat 22, and heating continues uninterrupted until substantially all the water is about 180 F., at which point the temperature-sensitive element 30 actuates the control 23, shutting off the gas to burner 15 without shutting off the gas to pilot 16. Because of the wall 36 in the valve 23, gas continues to flow to the pilot 16 but cannot flow to the main burner 15.

If a small withdrawal of water is made, cold water contacts the element 30, opening the main valve portion of the control 23 and the gas in burner 15 burns until the cold water at the bottom of the tank is heated to the designated temperature coincidentally raising the temperature of all of the water above the level of the element 30 thus creating temperature stratification as previously explained. When a large number of successive, short withdrawals is made, each immediately after the cut-out of the thermostat which operates valve 23, and each of just sufficient volume to cause said thermostat to cut in, the condition is aggravated and the temperature at the top of the tank 10 increases undesirably.

When the temperature of the water at the level of the element 27 reaches the cut-off temperature corresponding to the setting of the thermostat 22, the gas supply to the main burner 15 is shut off even though the temperature-sensitive element 30 may be demanding heat. It should be noted that the flow of gas to the pilot burner 16 is not interrupted by operation of thermostat 22. No additional gas will then be supplied to the burner 15 until the temperature at the top of the tank has been reduced to the proper value, i.e., below the cut-in temperature of thermostat 22.

A comparison of the operating characteristics of a 30-gallon gas water heater, similar to that shown in Fig. 1, rated at 35,750 B.t.u./hr., when equipped first with a conventional control and then with the control system of our invention, is illustrated in Figs. 10, 11, and 12.

Fig. 10 shows the temperature-vs.-time build-up characteristic 50 of the heater when operated solely under control of the control unit 23, which was set to give a cut-out temperature of 178 F., under stand-by conditions. The build-up characteristic was obtained by withdrawal of water until cut-in of the control unit (opening of its thermostatically controlled valve), followed by normal heating until cut-out of the control unit (closing of its thermostatically controlled valve), then repeating this cycle until steady state top-of-tank temperature was reached as determined by a thermocouple (not illustrated) located in the water at the top of the tank. Graphs of water withdrawals against time and of gas input against time for this test are also shown in Fig. 10.

The maximum build-up for this test was found to be 29 F., with the water at top-of-tank reaching a temperature of 207 F. Had the control unit been set for a temperature above 183 F. instead of at 178 F., it is apparent that water temperatures of 212 F. would have been exceeded.

Fig. 11 shows the build-up characteristic and corresponding graphs of water withdrawal-vs.-time and gas input-vs.-time for the same heater which was used in the test of Fig. 10, but controlled by the control system of our invention, the control unit 23 being identical in both cases, and the temperature-sensitive element 27 of the auxiliary thermostat 22 being located one and one-half inches below the top of the tank. In this case, the control unit cut-out setting was 177 F. and the auxiliary thermostat 22 had a cut-out temperature of approximately 184 F. and a cut-in temperature of approximately 180 F. The build-up in this test was limited to 7.5 F. by the action of the auxiliary thermostat.

It is to be observed from Fig. 11 that after the second withdrawal, the temperature at the level of the element 27 reached the cut-out temperature (184 F.) of the thermostat 22 before the temperature at the level of the element 30 had reached the cut-out setting (177 F.) of the control 23. On the next withdrawal, in order to cause cut-in of the thermostat 22, it was necessary to withdraw about 26 gallons of water before the incoming cold water reached the level of the element 27. (The indicated time delay in the withdrawal-vs.-time graph, between cut-off and cut-in of thermostat 22 was due to the test being conducted at a water withdrawal rate of 1 gallon per minute.) Upon cut-in of thermostat 22, the heater was called on to heat a relatively large quantity of cold water and hence recovered under normal control of the control 23 without build-up, to a temperature (171 F.) somewhat below the stand-by cut-out temperature, in accordance with its particular characteristic operation when heating a relatively large quantity of cold water to the cut-out condition. Upon continuation of the test, the cycle was repeated, as indicated in Fig. 11.

Fig. 12 shows similar graphs for the same heater with the auxiliary thermostat 22 lowered to 7 inches below the top of tank. In this test the control unit 23 was set to give a stand-by cut-out temperature of 184 F., with the thermostat 22 having cut-out and cut-in temperatures of approximately 200 F. and 194 F., respectively. The build-up in this test amounted to 19 F. which included several degrees of build-up (approximately 3 F.) above the auxiliary thermostat 22 because it was located an appreciable distance (7 inches) below the top of the tank.

In the test of Fig. 12, the top-of-tank temperature did not exceed 203 F., a temperature low enough to preclude any likelihood of operating an emergency temperature relief device (such as shut-off 21) set to operate at 210 F. The maximum top-of-tank temperature for this test could have been held to a much lower value by merely lowering the temperature setting of thermostat 22.

In the control system of our invention, after cut-out of the auxiliary thermostat 22, the main burner will not be supplied with gas until the incoming cold water rises high enough in the tank to cause this thermostat to cut in. When the auxiliary thermostat 22 was located close (1½ inches) from the top of the tank, as in the test of Fig. 11, about 26 gallons of water or approximately 88% of tank capacity could be withdrawn before this thermostat cut in, and about 70 minutes of heating was required to replenish the hot water. On the other hand, in the test of Fig. 12, with the auxiliary thermostat 22 moved down to 7 inches below the top of the tank, withdrawal of less than 12 gallons (40% of tank capacity) caused cut-in of this thermostat, with proportionately less time for recovery.

The examples of Figs. 11 and 12 show the flexibility of control inherent in the invention by suitable location of the auxiliary thermostat and settings of its cut-out and cut-in temperatures.

Figure 2:
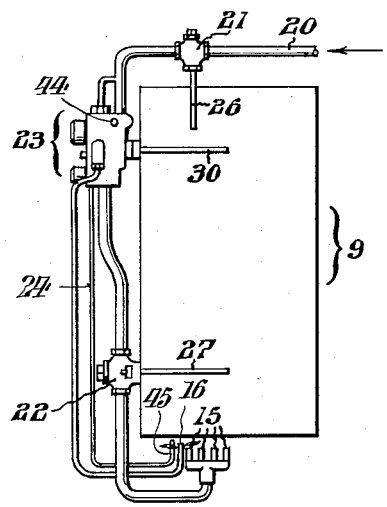
Figs. 2 and 3 represent schematic views similar to Fig. 1, illustrating modified forms of control systems in accordance with this invention.

Fig. 2 shows that the locations of the primary control unit 23 and the cyclic thermostat 22 may be reversed as compared with Fig. 1. The by-pass line 24 entirely by-passes the lower cyclic thermostat 22 and has no connection even with its housing.

Figure 3:
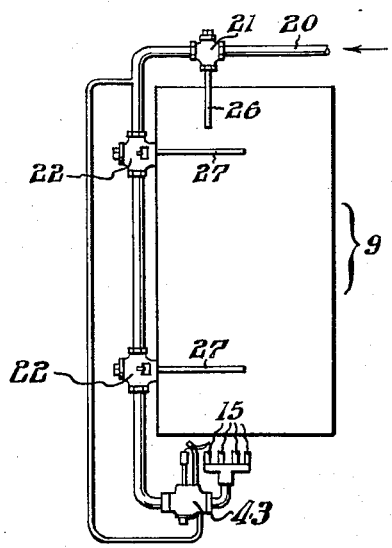

Fig. 3 shows that two relatively simple thermostats 22 which may be like the thermostat 22 of Fig. 1, may be used adjacent the top and bottom of the heater 9, with the pilot controlled by a conventional safety pilot 43, for example, that shown in U.S. Patent No. 2,322,520, granted to W. E. Jenkins on June 22, 1943. Other modifications will readily become apparent.

We are aware that emergency shut-off valves like the non-cyclic shut-off 21 for limiting the temperatures by shutting off the gas supply, and requiring manual servicing to restore the supply of gas, have been used at the top of the tank which is provided with a thermostat or control unit adjacent the bottom of the tank. However, to our knowledge the art has never suggested the incorporation into that combination of an additional auxiliary cyclic thermostat or control responsive to the temperature of the water at the top of the tank which is connected for cyclic control of the flow of gas to the control unit adjacent the tank bottom. We also believe it is new to include a separate gas supply line leading to the pilot burner, which is connected into the main gas supply line and by-passes the auxiliary cyclic thermostat. This is important and advantageous, particularly if it be desired to supply water at a temperature of the order of 180–190 F. from a gas storage water heater without risk of causing operation of the emergency shut-off.

The auxiliary thermostat 22, although illustrated as being of the immersion type, may be of any suitable type such as a surface-mounted gas thermostat or a thermostatically-operated electric switch controlling the operation of a solenoid-operated gas valve connected to an electric source through a low-voltage transformer.

It is to be understood that the thermostat 22 of Figs. 1 and 3 which has been described as having an adjustable setting, may equally as well be a non-adjustable type having fixed cut-out and cut-in temperatures, which is usually less expensive. Similarly, in the arrangement of Fig. 2 the thermostatic valve of the control 23 may be of the non-adjustable type set for cut out at some temperature below the operating temperature of the shut-off 21.

It is also to be understood that although the safety pilots illustrated (safety pilot 43 and the control unit 23) are of the 100% shut-off type, i.e. they function to shut off the pilot burner as well as the main burner, if desired, our temperature control system may be used with safety pilots well known in the art which shut off only the main burner supply line when the pilot is extinguished.

We have illustrated the flue 17 as being of the internal type extending vertically through the tank 10, but it is to be understood that the invention is equally applicable to gaseous fuel heaters of the external flue type in which the tank wall, either in whole or in part, forms part of the flue passage and is heated by the combustion products flowing therethrough.

Although we have described our invention with reference to several modifications thereof, it will be appreciated that various other modifications may be made, including the substitution of equivalent elements for those shown in the drawings, reversals of parts, and the use of certain features of the invention independently of the

Having thus described our invention, we claim:

1. In a temperature control system for a storage water tank which includes a gas burner located below the bottom of said tank, said gas burner having a flue for venting the hot combustion products, which flue is in heat exchanging relationship with the water in the upper portion of said tank, the combination comprising an emergency shut-off valve responsive to the temperature of the water in the general region of the top of the tank, an upper cyclic, thermostatically controlled valve also responsive to the temperature of the water in the general region of the top of the tank, a lower cyclic thermostatically controlled valve responsive to the temperature of the water in the general region of the bottom of the tank, and a gas feed line communicating with a source of gas and connected in series from said source through said emergency shut-off valve, then through said upper valve and then through said lower valve to said gas burner, said cyclic thermostatically controlled valves being constructed and arranged to activate and to inactivate the gas burner repeatedly and automatically and solely in response to fluctuations of water temperature without requiring any manual re-setting, said upper cyclic thermostatically controlled valve being adjusted to inactivate said burner at a predetermined upper region water temperature and said lower cyclic thermostatically controlled valve being adjusted to inactivate said burner at a lower region water temperature which is essentially lower than said predetermined upper region temperature, and said emergency shut off valve being adjusted for one-way closing movement in response to an upper region water temperature which is essentially greater than either of the aforementioned temperatures.

2. The combination defined in claim 1, further characterized by the fact that a pilot burner is provided for lighting said gas burner, and a pilot gas line is connected to said gas feed line between said emergency shut-off valve and said upper cyclic valve to feed gas to said pilot burner from said gas feed line, said pilot gas line by-passing both said upper and lower cyclic valves, whereby said pilot burner is unaffected by operation of either or both cyclic valves but is shut off upon operation of said emergency shut-off valve.

3. In a temperature control system for a gaseous fuel storage water heater having main and pilot burners located below said tank and supplied with gaseous fuel from separate main burner and pilot burner fuel lines connected to a common supply line, the combination of an auxiliary upper cyclic thermostat in the main burner fuel line having valve means responsive to the temperature of the water in the general region of the top of the tank for shutting off and for opening said main burner fuel line at respective predetermined temperatures, a primary lower cyclic thermostat control in said main burner fuel line between said auxiliary thermostat and said main burner having valve means responsive to the temperature of the water in the general region of the bottom of the tank for shutting off and for opening said main burner fuel line at respective predetermined temperatures, and said pilot burner fuel line being connected to said common supply line on the supply side of said auxiliary thermostat valve means and bypassing both said valve means, so that the gas flow to the pilot burner is continuous even when the auxiliary thermostat valve is closed, said cyclic thermostats being constructed and arranged to activate and to inactivate the main burner repeatedly and automatically and solely in response to fluctuations of water temperature without requiring any manual resetting, said upper cyclic thermostat being adjusted to inactivate said main burner at a predetermined upper region water temperature and said lower cyclic thermostat being adjusted to inactivate said main burner at a lower region water temperature which is essentially lower than said predetermined upper region temperature, and a non-cyclic emergency shut-off valve connected in said common supply line on the supply side of its connection with said pilot burner fuel line, said emergency shut-off valve being responsive to the temperature of the water in the general region of the upper portion of the tank for shutting off said supply line at a predetermined temperature, and said emergency shut off valve being adjusted for one-way closing movement in response to an upper region water temperature which is essentially higher than that at which the upper thermostat is adjusted to inactivate the main burner.

4. A storage water heater comprising an upright enclosed substantially cylindrical tank having a vertical axis, said tank having a concave bottom forming a gas combustion space, a cylindrical flue pipe extending from said combustion space through the bottom of said tank vertically upwardly through said tank and out through the top of said tank, a pipe extending into the bottom of said tank for the introduction of cold water, a pipe extending from the top of said tank for the withdrawal of hot water, a non-cyclic, manually resettable emergency shut-off valve which is connected to and controlled by a temperature sensitive element which extends through the top of said tank, an upper cyclic auxiliary control valve connected to and controlled by a thermostat which extends through said tank adjacent the top thereof, a cyclic main control valve connected to and controlled by a thermostat which extends through said tank adjacent the bottom thereof, a main gas burner in said gas combustion space, a pilot gas burner in said gas combustion space, a main gas supply line which extends from a source through said emergency shut-off valve, upper control valve, and main control valve in that order to said main burner, and a pilot gas supply line extending from main gas supply line at a location intermediate said emergency shut-off valve and said upper control valve, by-passing said upper control valve and main control valve and connected directly to said pilot burner.

5. In combination with a control for a gaseous-fueled storage water heater having main and pilot burners, a main burner fuel supply line, a pilot burner fuel supply line, a manually controllable main fuel valve connected in said main burner and pilot burner fuel supply lines and movable to different positions for controlling the supply of fuel to the main and pilot burners and having a shut-off position in which it shuts off both the main and pilot burner fuel supply lines, said main fuel valve having two separate inlet and two separate outlet passages for the main and pilot gaseous fuel respectively, a cyclic thermostat coupled with a thermostatically responsive main control valve in the main burner supply line between the main fuel valve and the main burner, an auxiliary cyclic thermostat coupled with an auxiliary thermostatically controlled valve in the main burner supply line ahead of said main control valve, said cyclic thermostats being constructed to open and close the main burner fuel supply line repeatedly and automatically and solely in response to fluctuations of water temperature without requiring any manual resetting, and means in said main fuel valve forming a barrier supported on a rotatable core and comprising a wall arranged to separate said main fuel passages from said pilot fuel passages, said means preventing any gaseous fuel communication between said main burner fuel supply line and said pilot burner fuel supply line on the outlet side of said main fuel valve, and thereby preventing any supply of fuel to the main burner from the pilot fuel line.

6. The combination defined in claim 5, wherein said core includes a peripheral passage arranged to connect the pilot fuel inlet passage with said pilot fuel outlet passage while said wall blocks said main fuel inlet passage and said pilot fuel inlet passage from said main fuel outlet passage.

References Cited in the file of this patent

UNITED STATES PATENTS

| | | |
|---|---|---|
| 1,108,772 | Meacham | Aug. 25, 1914 |
| 1,237,403 | Stack | Aug. 21, 1917 |
| 1,421,692 | | |
| 1,723,567 | | |
| 1,991,863 | | |
| 2,013,713 | | |
| 2,102,752 | | |
| 2,361,944 | | |
| 2,806,652 | | |
| 1,421,692 | Hutchins | July 4, 1922 |
| 1,723,567 | Lovekin | Aug. 6, 1929 |
| 1,991,863 | Morrow | Feb. 19, 1935 |
| 2,013,713 | Hamilton | Sept. 10, 1935 |
| 2,102,752 | Schoenfeld | Dec. 21, 1937 |
| 2,361,944 | Jackson | Nov. 7, 1944 |
| 2,806,652 | Arden | Sept. 17, 1957 |